(12) United States Patent
Lawlor et al.

(10) Patent No.: US 7,228,964 B2
(45) Date of Patent: Jun. 12, 2007

(54) STORAGE CASE FOR A COMPACT DISC

(75) Inventors: John Joseph Lawlor, 10 Carlton Road, Marino, Dublin (IE) 3; William Peter Lawlor, 29 Venetian Hall, Howth Road, Dublin, Dublin (IE) 3; Patrick Christopher Wright, Dublin (IE); John Joseph McCormack, Newbridge (IE); Owen Paul Laverty, Dublin (IE)

(73) Assignees: John Joseph Lawlor, Dublin (IE); William Peter Lawlor, Dublin (IE)

(*) Notice: Subject to any disclaimer, the term of this patent is extended or adjusted under 35 U.S.C. 154(b) by 169 days.

(21) Appl. No.: 10/644,915

(22) Filed: Aug. 21, 2003

(65) Prior Publication Data

US 2005/0072693 A1 Apr. 7, 2005

Related U.S. Application Data

(63) Continuation of application No. 10/030,227, filed as application No. PCT/IE00/00086 on Jul. 7, 2000, now abandoned.

(51) Int. Cl.
*B65D 85/57* (2006.01)
(52) U.S. Cl. .................. 206/308.1; 206/312
(58) Field of Classification Search ............. 206/309, 206/308.1, 312, 387.12, 307, 310, 311, 473; 369/291; 312/9.47, 9.53, 9.56, 9.63, 9.58; 211/40, 41.12, 194
See application file for complete search history.

(56) References Cited

U.S. PATENT DOCUMENTS

| | | | | |
|---|---|---|---|---|
| 3,951,264 A | * | 4/1976 | Heidecker et al. | 206/308.3 |
| 4,266,784 A | * | 5/1981 | Torrington | 720/632 |
| 4,722,439 A | * | 2/1988 | Grobecker et al. | 206/308.1 |
| 4,771,890 A | * | 9/1988 | Hofland et al. | 206/445 |
| 4,881,640 A | * | 11/1989 | Herr et al. | 206/313 |
| 4,899,875 A | * | 2/1990 | Herr et al. | 206/308.1 |
| 5,590,769 A | | 1/1997 | Lin | |
| 5,662,216 A | | 9/1997 | Alexander et al. | |
| 5,704,474 A | | 1/1998 | Oland | |
| 5,730,283 A | | 3/1998 | Lax | |
| 5,878,879 A | * | 3/1999 | Liao | 206/308.1 |
| 5,938,020 A | * | 8/1999 | Luckow | 206/308.1 |
| 6,024,214 A | * | 2/2000 | Cowan | 206/308.1 |
| 6,164,446 A | * | 12/2000 | Law | 206/308.1 |
| 6,443,300 B1 | * | 9/2002 | Gelardi | 206/312 |
| 6,454,090 B1 | * | 9/2002 | Flores et al. | 206/308.1 |

\* cited by examiner

*Primary Examiner*—David T. Fidei
(74) *Attorney, Agent, or Firm*—Sughrue Mion, PLLC

(57) ABSTRACT

A storage case (1) for a compact disc (2) comprises an outer shell (4) within which an inner carrier (5) for storing the compact disc (2) is slideable between an open and a closed position. The compact disc (2) is stored in a disc storing area (20) between a lower support plate (15) and an upper retaining member (19) of the inner carrier (5). Guide plates (25, 26) slideably guide the compact disc (2) into and out of the disc storing area (20). Resilient disc engaging clips (30) on a rear end wall (17) of the inner carrier (5) resiliently urges the compact disc (2) against corresponding abutment members (33) on the front end wall (16) for securing the compact disc (2) against sideward sliding from the disc storing area (20). The combination of the disc engaging clips (30) and the guide plates (25, 26) avoid the need for a central locating spigot for engaging a central opening of the compact disc (2).

22 Claims, 10 Drawing Sheets

STORAGE CASE FOR A COMPACT DISC

This is a Continuation of Application Ser. No. 10/030,227 filed Jan. 8, 2002, now abandoned, which is a National Stage Entry of Application No. PCT/IE00/00086 filed Jul. 7, 2000; the above noted prior applications are all hereby incorporated by reference.

BACKGROUND OF THE INVENTION

The present invention relates to a storage case for a compact disc, or other such data carrying disc.

Compacts discs, for example, music compact discs, CD ROMS and also DVD discs are typically stored in a storage case, such storage cases for compact discs are typically referred to as dual boxes. In general, such compact disc storage cases or dual boxes comprise a base within which the compact disc is located on a centrally disposed upwardly extending spigot. The spigot engages a central opening in the compact disc. A lid is typically hingedly connected to the base for closing the storage case. Alternatively, the base may be slideable within an outer shell type housing between open and closed positions. However, in general, all such storage cases require that the compact disc be located and secured in the base on a central spigot engaging the central opening of the compact disc. This has a number of disadvantages. In particular, it can lead to damage to the compact disc when the compact disc is being engaged on or disengaged from the central spigot. Such central spigots, in general, tend to be a relatively tight interference fit with the central opening of the compact disc, and both to engage the compact disc on the spigot and in particular, to disengage the compact disc from the spigot requires a considerable amount of force, which causes bending of the compact disc, which can in turn lead to breakages and other damage to the compact disc. The need to apply a relatively significant amount of force to a compact disc, in particular, to remove the compact disc from the central spigot, as well as causing breakage of the disc, can also cause damage to the reflective coating on the compact disc as a result of manhandling of the disc. This is undesirable.

Storage cases in which a base slideably engages an outer shell are described and illustrated in U.S. Pat. Nos. 5,249,677; 5,360,107; 5,520,279; 5,549,199. However, these storage cases all include a central spigot for locating and securing the compact disc on the base. There is therefore a need for a storage case for a compact disc and other such music and/or data carrying discs which avoids the need for a central spigot for locating and securing the compact disc in the storage case.

The present invention is directed towards providing such a storage case.

SUMMARY OF THE INVENTION

According to the invention there is provided a storage case for a data or music disc, the storage case comprising an outer shell, and an inner carrier, the inner carrier defining a disc accommodating means for receiving and storing a disc therein with the disc defining a storing plane, the inner carrier being slideable in the outer shell between a closed position within the outer shell and an open position extending outwardly of the outer shell for providing access to the disc accommodating means, and a securing means in the inner carrier for securing the disc in the disc accommodating means, wherein a guide means is provided in the inner carrier for slideably guiding the disc with the disc lying in the storing plane into and out of the disc accommodating means, and the securing means secures the disc in the storing plane in the disc accommodating means against sliding movement in the storing plane through the guide means.

In one embodiment of the invention the securing means is located adjacent the disc accommodating means and extends inwardly thereto for releaseably securing the disc in the disc accommodating means against sliding movement through guide means.

Preferably, the outer shell cooperates with the inner carrier for enclosing the disc accommodating means when the inner carrier is in the closed position.

In another embodiment of the invention the inner carrier comprises a lower support means for supporting the disc thereon, and an upper retaining means spaced apart from the lower support means and cooperating with the lower support means for defining the disc accommodating means and for retaining the disc in the disc accommodating means against movement of the disc perpendicularly to the storing plane. Preferably, the lower support means comprises a support plate for co-operating with the outer shell when the inner carrier is in the closed position for enclosing the disc accommodating means.

In another embodiment of the invention the outer shell comprises a top plate and a pair of spaced apart elongated side walls extending downwardly from the top plate for co-operating with the inner carrier for enclosing the disc accommodating means. Preferably, the top plate of the outer shell and the support plate of the inner carrier extend parallel to each other and are spaced apart therefrom when the inner carrier is in the closed position. Advantageously, each side wall of the outer shell defines an elongated track for slideably engaging and accommodating the inner carrier between the open and closed positions. Ideally, the outer shell is of inverted U-shaped transverse cross-section.

In one embodiment of the invention a pair of inwardly directed lips extend from the respective side walls for forming the corresponding tracks.

In another embodiment of the invention a pair of spaced apart front and rear end walls extend upwardly from the lower support means of the inner carrier and define with the lower support means and the upper retaining means the disc accommodating means, the front and rear spaced apart end walls extending between the side walls of the outer shell when the inner carrier is in the closed position. Preferably, the upper retaining means of the inner carrier comprises an upper retaining member extending between the respective front and rear end walls.

In one embodiment of the invention the securing means is located between the lower support means and the upper retaining means of the inner carrier. Preferably, the securing means comprises a pair of spaced apart disc engaging clips for engaging the disc on respective opposite sides of a diameter of the disc, and for urging the disc diametrically along the said diameter into engagement with a diametrically opposed disc abutment means for securing the disc in the disc accommodating means. Advantageously, at least one of the disc engaging clips of the securing means is resiliently mounted for resiliently engaging the disc as the disc is slid from one side into and out of the disc accommodating means. Ideally, each of the disc engaging clips of the securing means is resiliently mounted for resiliently engaging the disc as the disc is slid from either side into and out of the disc accommodating means.

In one embodiment of the invention the disc engaging clips are mounted on one of the front and rear end walls, and the disc abutment means is mounted on the other of the front and rear end walls, and preferably, the disc abutment means is provided by a pair of spaced apart abutment members for engaging the disc on respective opposite sides of the said diameter of the disc.

In one embodiment of the invention the guide means is provided to one side of the upper retaining means for slideably guiding the disc into and out of the disc accommodating means. Preferably, a pair of guide means are provided on respective opposite sides of the upper retaining means. Advantageously, each guide means comprises a pair of spaced apart guide plates located above and spaced apart from the lower support means at respective opposite ends thereof for slideably guiding the disc into and out of the disc accommodating means.

In another embodiment of the invention a locating means is provided on the outer shell for co-operating with an outer shell of an adjacent storing case for accommodating stacking of the storage case with the other storage case, one above the other.

In a further embodiment of the invention the locating means comprises one of a first male and female locating means mounted on one of a side or end of the outer shell for co-operating with a corresponding other of a first male or female locating means on the outer shell of the other storage case, and one of a second male and female locating means on the other of the side or end of the outer shell for co-operating with a corresponding other of a second male and female locating means on the outer shell of the other storage case. Preferably, the other of the first male and female locating means and the other of the second male and female locating means are provided on the outer shell for co-operating with corresponding others of first and second male and female locating means on an outer shell of another storage case.

Preferably, the first male locating means extends upwardly from the top plate of the outer shell. Advantageously, the second male locating means extends upwardly from the top plate of the outer shell. Advantageously, a pair of spaced apart second male locating means are provided on the top plate of the outer shell.

Preferably, the first female locating means is located on the underside of the outer shell. Advantageously, the second female locating means is located on the underside of the outer shell.

In one embodiment of the invention one of the inner carrier and the outer shell defines a label receiving means. Preferably, the lower support means of the inner carrier is of double skinned construction for defining the label receiving means therebetween.

In one embodiment of the invention the disc accommodating means is a disc storing area.

In another embodiment of the invention the disc accommodating means defines a compact disc.

In a further embodiment of the invention the disc accommodating means defines a CD ROM compact disc.

In a still further embodiment of the invention the disc accommodating means defines a music compact disc.

In a still further embodiment of the invention the disc accommodating means defines a DVD disc.

In one embodiment of the invention a first grip means is provided for releasably engaging and retaining the inner carrier in the closed position in the outer shell.

In another embodiment of the invention a second grip means is provided for retaining the inner carrier connected to the outer shell when the inner carrier is in the open position. Preferably, the second grip means releasably retains the inner carrier connected to the outer shell when the inner carrier is in the open position.

The advantages of the storage case according to the invention are many. The storage case according to the invention allows a disc, for example, a compact disc, a CD ROM disc and the like to be stored in the disc accommodating means without damage to the disc, and in particular, allows the disc to be inserted into and withdrawn from the disc accommodating means without damage to the compact disc. This is achieved by virtue of the fact that a guide means is provided for guiding the disc slideably in the storing plane into and out of the disc accommodating means, and also by virtue of the fact that a securing means secures the disc in the disc accommodating means against sideward sliding in the storing plane through the respective guide means. Accordingly, there Is no need for a central spigot for engaging a centre bore of the disc as has been a requirement in disc storage cases known heretofore. By virtue of the fact that the central spigot may be dispensed with in the storage case according to the invention the disc can be readily easily slid into and out of the disc accommodating means and secured in the disc accommodating means without any danger of damage to the compact disc which would otherwise occur if the compact disc had to be forced onto or off of a central locating spigot.

BRIEF DESCRIPTION OF THE DRAWINGS

The invention will be more dearly understood from the following description of a preferred embodiment thereof which is given by way of example only with reference to the accompanying drawings, in which.

DETAILED DESCRIPTION OF THE INVENTION

Figure 1:
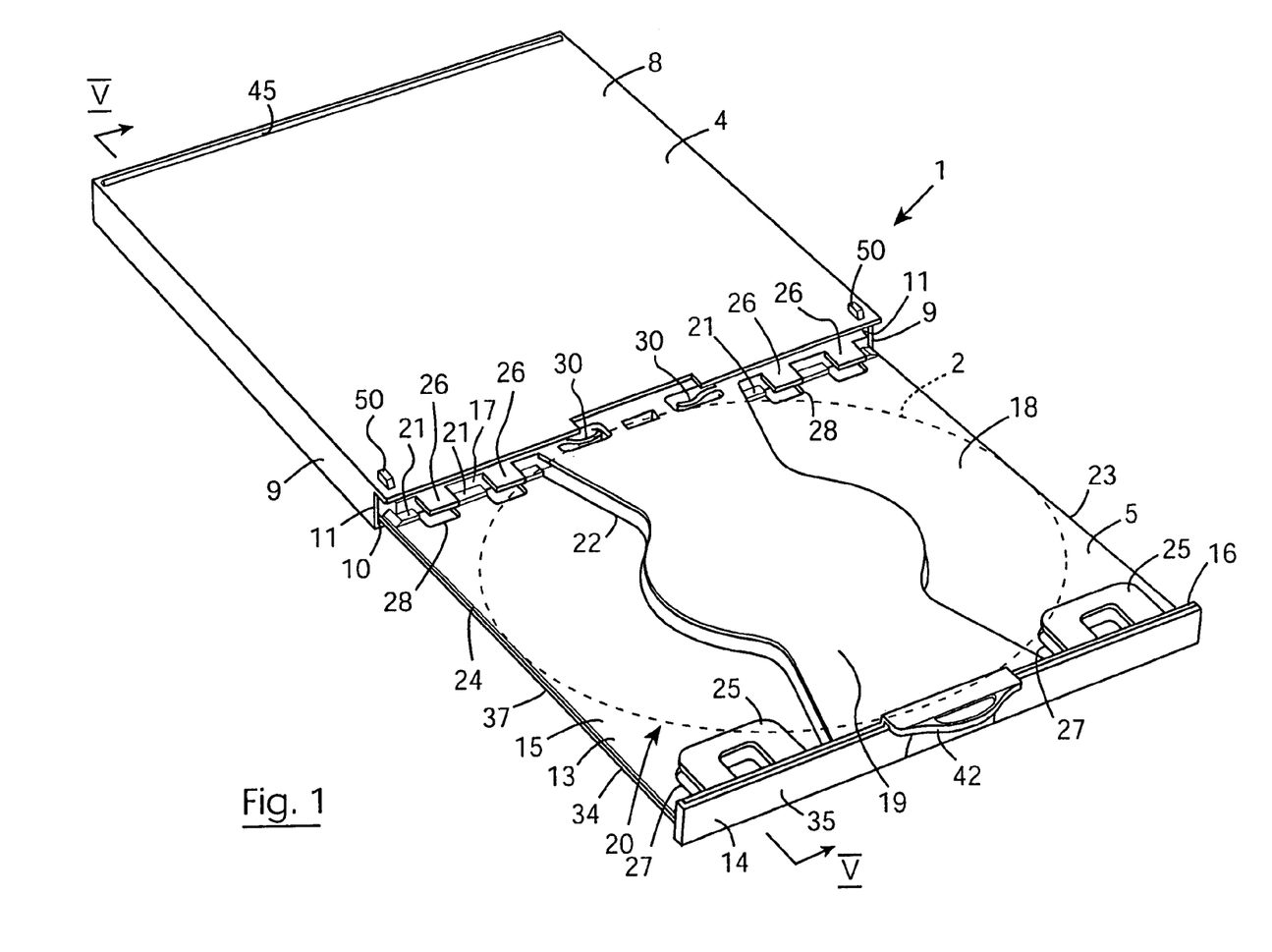
FIG. 1 is a perspective view of a storage case according to the invention for storing a compact disc or a CD ROM disc.
Figures 2, 8, 9:
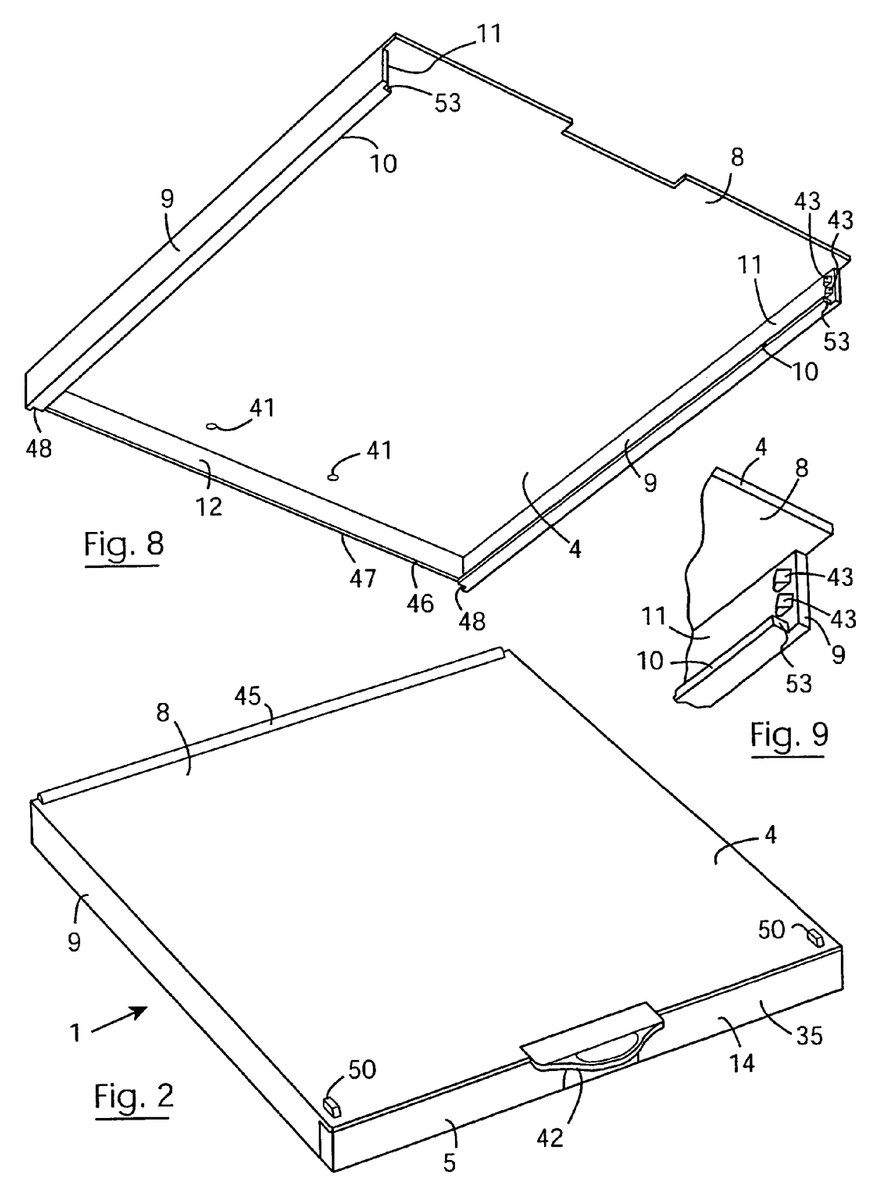
FIG. 2 is a perspective view of the storage case with a part of the storage case in a different position.
FIG. 8 is an underneath perspective view of another portion of the storage case of FIG. 1.
FIG. 9 is a perspective view of a detail of the portion of the storage case of FIG. 1 illustrated in FIG. 8.
Figure 3:
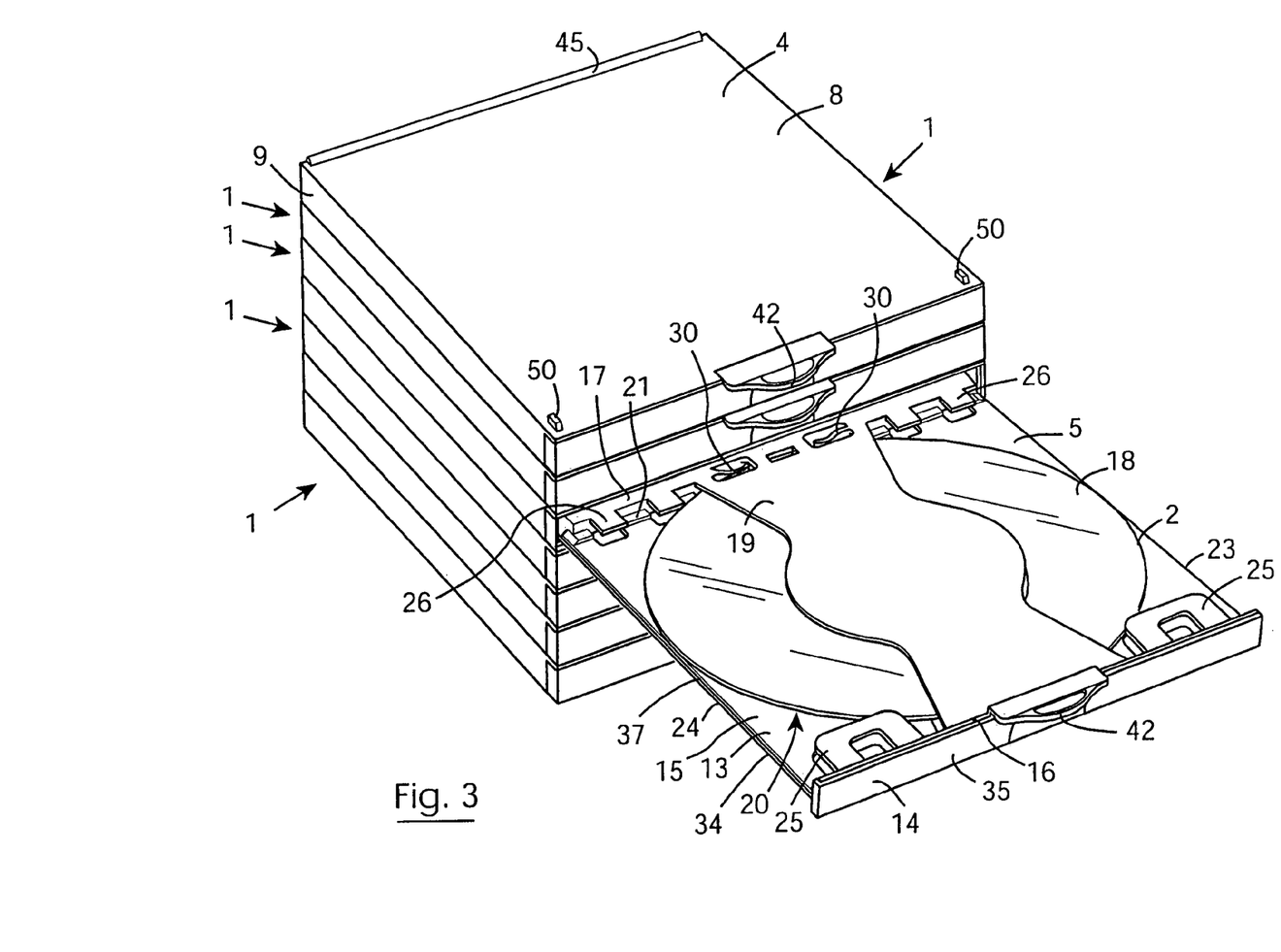
FIG. 3 is a perspective view of a plurality of storage cases of FIG. 1 illustrated stacked one above the other.

Referring to the drawings there is illustrated a storage case according to the invention indicated generally by the reference numeral 1 for storing a compact disc 2 which may be a music compact disc, or a CD ROM. The storage case 1 comprises an outer shell 4 of plastics material within which an inner carrier 5 also of plastics material for storing the compact disc 2 is slideable between a closed position illustrated in FIG. 2 within the outer shell 4, and an open position illustrated in FIG. 1 extending outwardly from the outer shell 4 for providing access to the compact disc 2 for facilitating inserting and withdrawing the compact disc 2 Into and out of the inner carrier 5. The outer shell 4 Is also adapted for stacking as will be described below so that a plurality of storage cases 1 can be stacked one above the other as illustrated in FIG. 3.

The outer shell 4 is of inverted U-shaped cross-section, and comprises a top plate 8 from which a pair of spaced apart parallel side walls 9 extend downwardly. A pair of inwardly directed lips 10 extend inwardly from the side walls 9 and form with the top plate 8 a pair of tracks 11 within which the inner carrier 5 is slideable between the open and dosed positions. An end stop wall 12 extending downwardly from the top plate 8 between the side walls 9 acts as a stop means for stopping and locating the inner carrier 5 in the dosed position.

Turning now to the inner carrier 5, the inner carrier 5 is formed in two parts, namely, a main carrier 13 and an outer tray 14 which are adapted for securing together with a snap fit action. The main carrier 13 comprises a support means, namely, a support plate 15 from which a pair of spaced apart parallel front and rear end walls 16 and 17, respectively, extend upwardly. An upper retaining means comprising an upper retaining member 19 extends between the front and rear end walls 16 and 17 and is spaced apart above the support plate 15 for defining with the support plate 15 and the front and rear end walls 16 and 17 a compact disc accommodating means, namely, a compact disc storing area 20 within which the compact disc 2 is stored in a storing plane 18 extending parallel to the support plate 15 and the retaining member 19. Support benching 21 extending upwardly from the support plate 15 along the front and rear end walls 16 and 17 supports the compact disc 2 in the storing plane 18 in the disc storing area 20. In this embodiment of the invention the upper retaining member 19 is double hourglass shaped. Additionally, for facilitating manufacture of the main carrier 13 an opening 21 of similar shape and corresponding to the retaining member 19 is formed in the support plate 15. In this embodiment of the invention the rear end wall 17 is relatively wide and is hollow for accommodating a label for identifying the subject matter of the compact disc 2.

A guide means for guiding a compact disc 2 in the plane 18 from either side 23 or 24 of the inner carrier 5 into the disc storing area 20 is provided on each side of the retaining member 19, and each guide means comprises a forward guide plate 25 extending from the front end wall 16 and a pair of rearward guide plates 26 extending from the rear end wall 17. The guide plates 25 and 26 co-operate with the corresponding support benching 21 for guiding the compact disc 2 with the compact disc 2 lying in the storing plane 18 into and out of the disc storing area 20 from either side 23 or 24 thereof. Openings 27 and 28 are formed in the support plate 15 and the support benching 21 corresponding to the guide plates 25 and 26, respectively, for facilitating manufacture of the main carrier 13.

A securing means for securing the compact disc 2 in the disc storing area 20 against sideward slideable movement comprises a pair of resilient disc engaging clips 30 which are integrally formed with the rear end wall 17. The disc engaging clips 30 are located on each side of a centre line 31 of the inner carrier 5, which coincides with a corresponding diameter 32 of the compact disc 2 so that the disc engaging clips 30 engage the compact disc 2 on respective opposite sides of the diameter 32. The disc engaging clips 30 urge the compact disc diametrically along the diameter 32 into engagement with a disc abutment means, provided by a pair of spaced apart abutment members 33 extending from the front end wall 16 for engaging the compact disc 2 on respective opposite sides of the diameter 32. The resilience of the disc engaging clips 30 is such as to accommodate a compact disc 2 sliding into and out of the disc storing area 20 and then for engaging the compact disc 2 in the disc storing area 20 with a relatively light snap fit type of action.

The outer tray 14 comprises a base 34 and front and rear end walls 35 and 36, respectively, extending upwardly from the base 34. The front and rear end walls 35 and 36 engage the front and rear end walls 16 and 17 with a snap fit action for securing the main carrier 13 and the outer tray together. When assembled together the base 34 of the outer tray 14 and the support plate 15 of the main carrier 13 together define a label accommodating means, namely, a label accommodating area 37 within which a label 38 for example, a label identifying the subject matter of the compact disc 2 is sandwiched therebetween. A pair of grooves 39 are formed on respective opposite sides of the base 34 for slideably engaging the lips 10 of the side walls 9 for accommodating sliding of the inner carrier 5 between the closed and open positions.

A first grip means provided by resilient gripping lugs 40 are located on the rear end wall 17 of the main carrier 13 for engaging corresponding notches 41 in the top plate 8 of the outer shell 4 for releasably retaining the inner carrier 5 in the closed position. A second grip means for releasably retaining the inner carrier 5 connected to the outer shell 4 when the inner carrier 5 is in the open position comprises a pair of stop members 43 on each of the side walls 9 of the outer shell 4 for engaging corresponding stop members 44 extending sidewardly from the rear end wall 17 of the inner carrier 5, when the inner carrier 5 is in the open position.

A handle 42 extends from the front end wall 16 of the main carrier 13 for facilitating sliding of the inner carrier S in the outer shell 4 between the open and closed positions.

Figure 4:
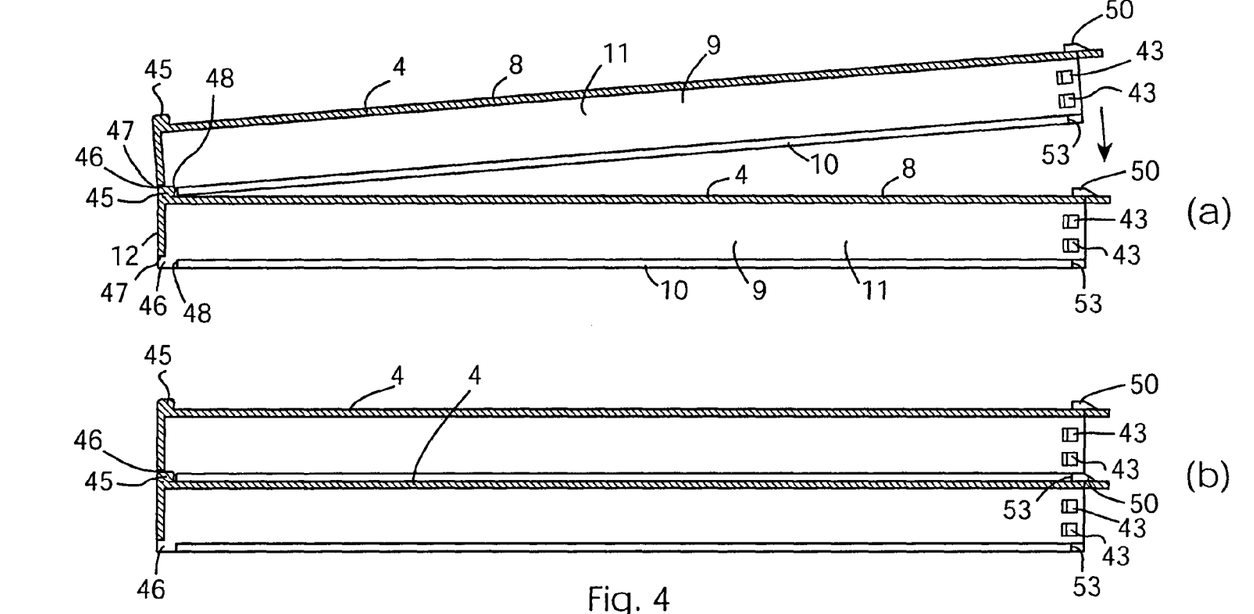
FIGS. 4(a) and 4(b) are cross-sectional side elevational views of portions of two of the storage cases of FIG. 1 illustrated being stacked.
Figure 5:
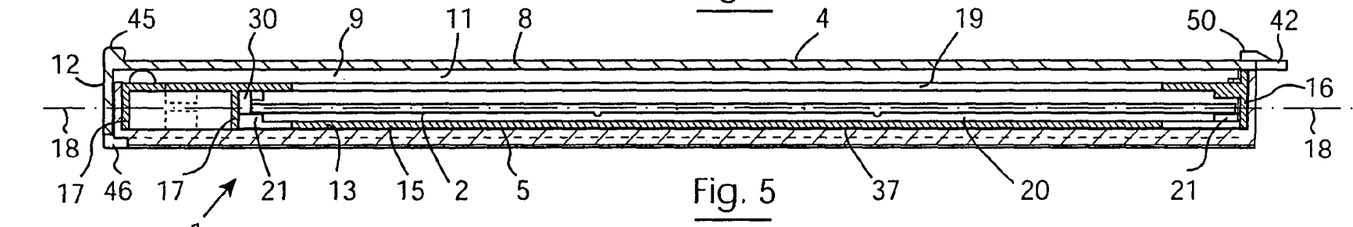
FIG. 5 is a transverse cross-sectional side elevational view of the storage case of FIG. 1.
Figure 6:
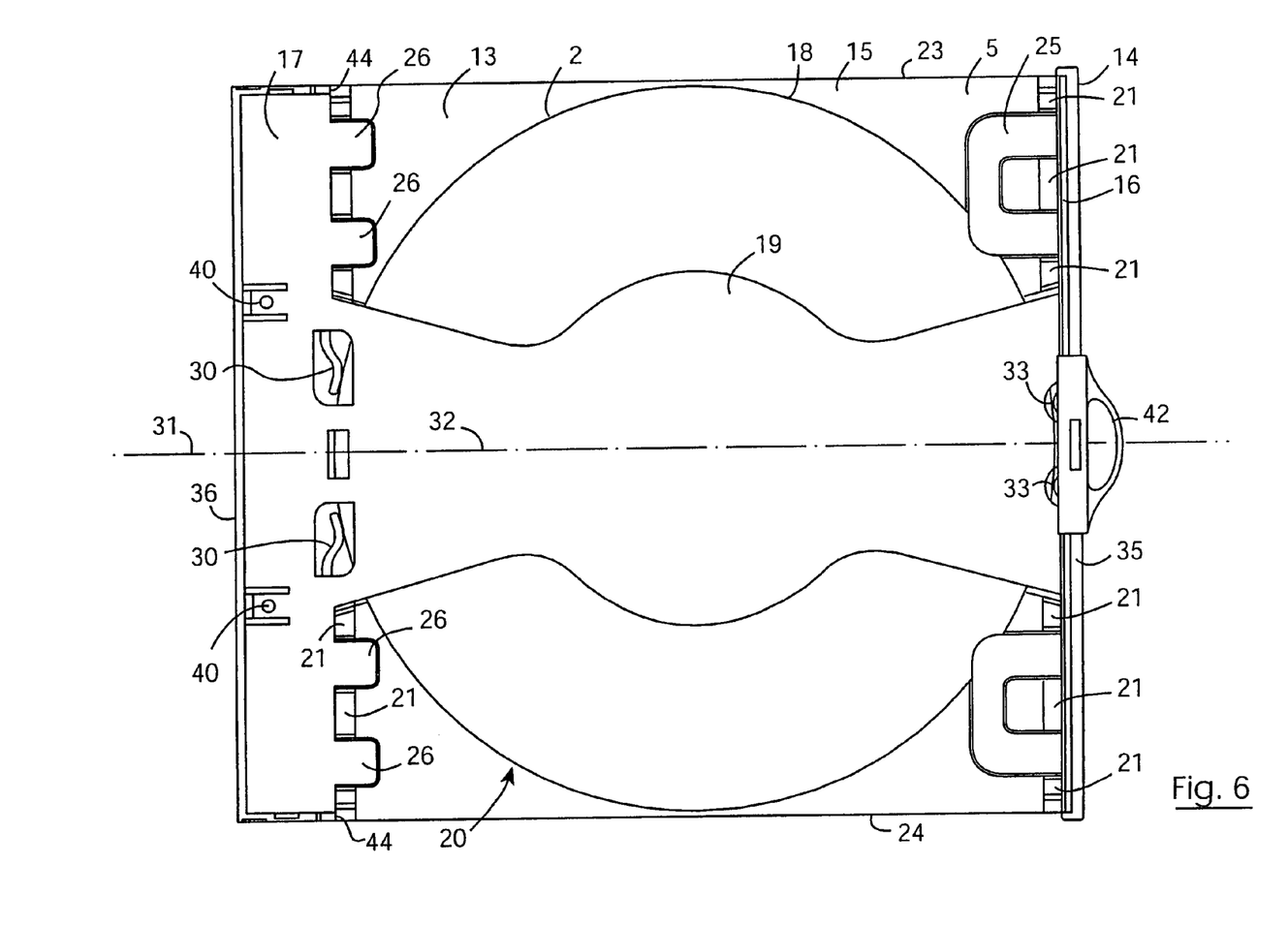
FIG. 6 is a plan view of a portion of the storage case of FIG. 1.
Figure 7:
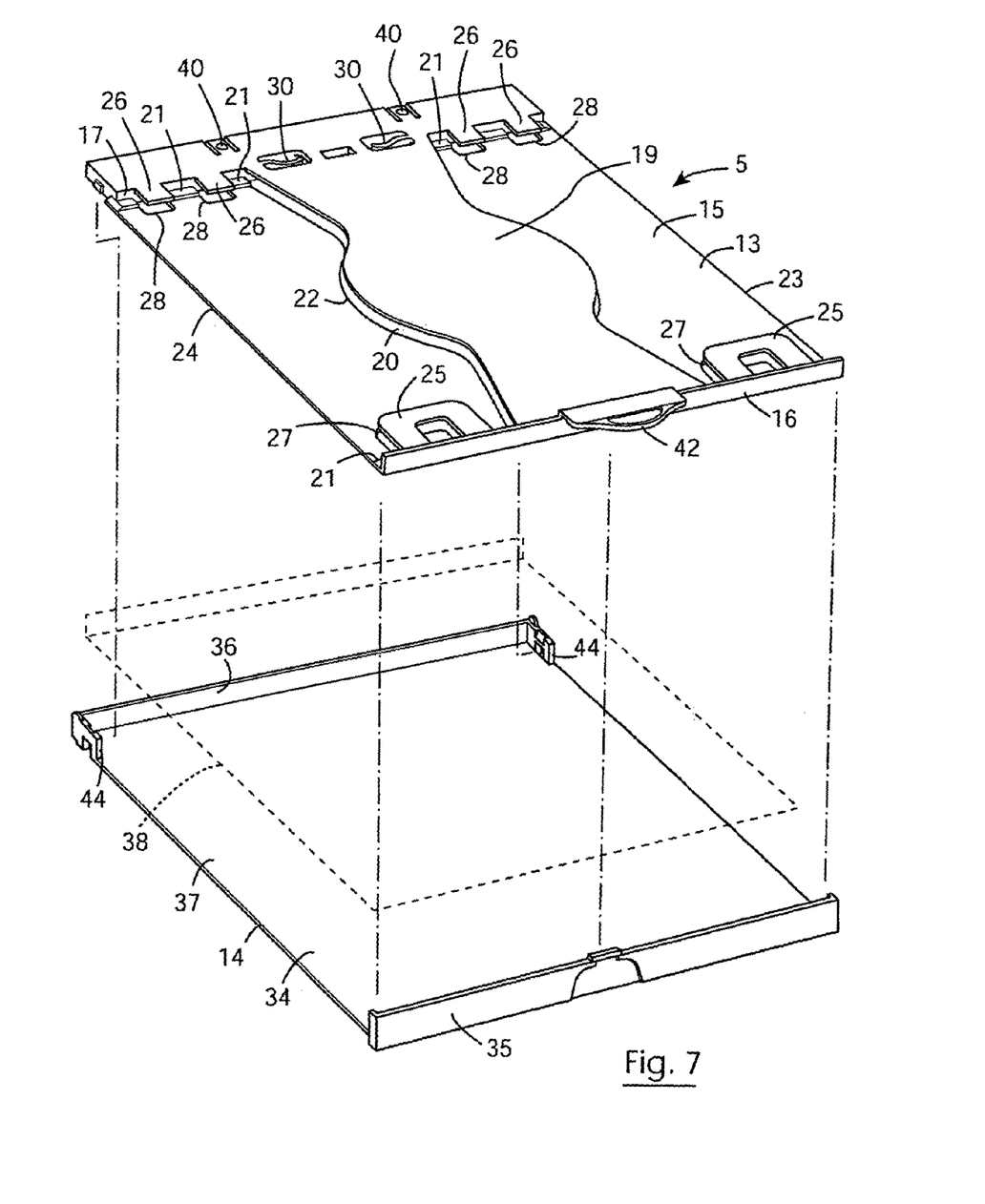
FIG. 7 is an exploded perspective view of the part of the storage case of FIG. 1 which is illustrated in FIG. 6.
Figures 10, 16, 17, 18:
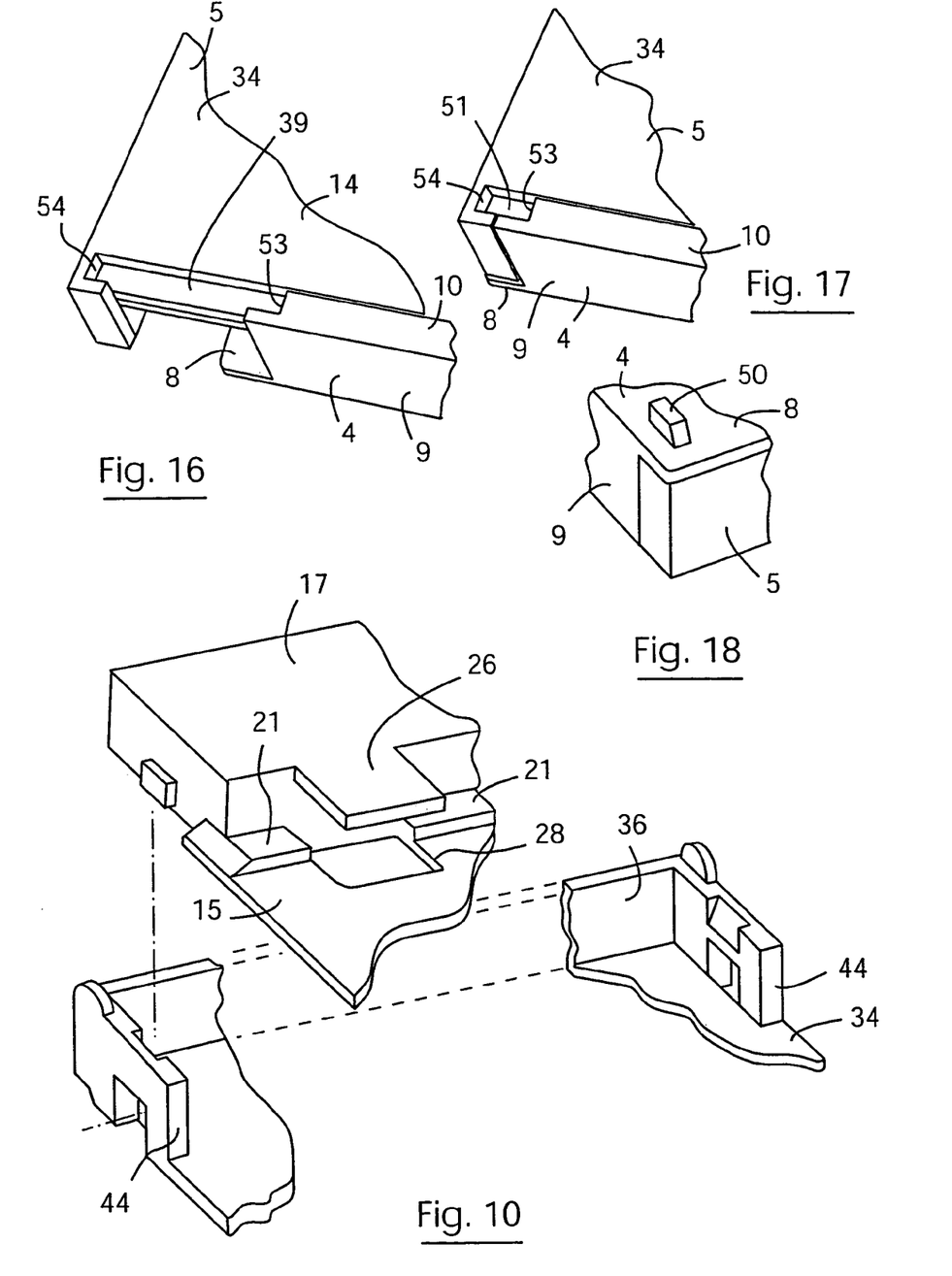
FIG. 10 is an exploded perspective view of a detail of the portion of the storage case of FIG. 1 which is illustrated in FIG. 7.
FIG. 16 is a perspective View of a detail of the storage case of FIG. 1.
FIG. 17 is perspective view of the detail of FIG. 16 illustrated in a different position.
FIG. 18 is a perspective view of another detail of the storage case of FIG. 1.
Figure 11:
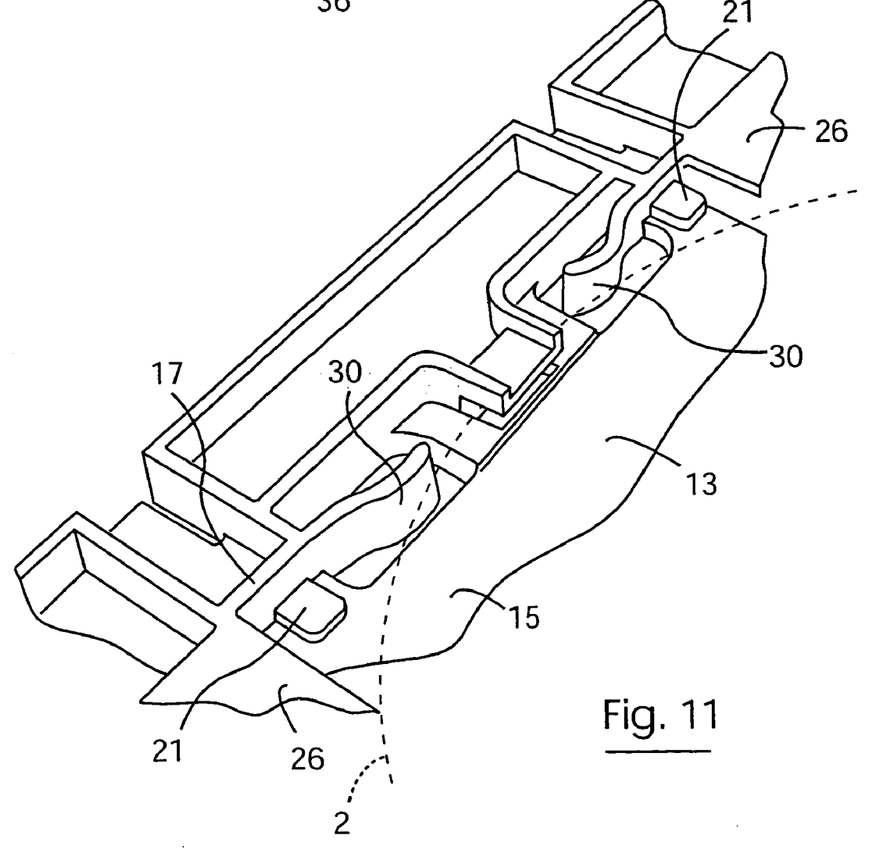
FIG. 11 is a perspective view of a detail of the portion of the storage case of FIG. 1 illustrated in FIG. 7.
Figure 12:
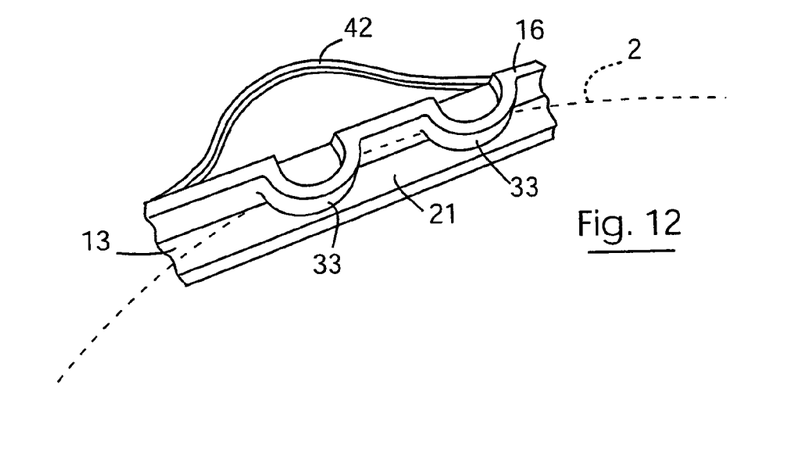
FIG. 12 is a perspective view of another detail of the storage case of FIG. 1 which is illustrated in FIG. 7.
Figure 13:
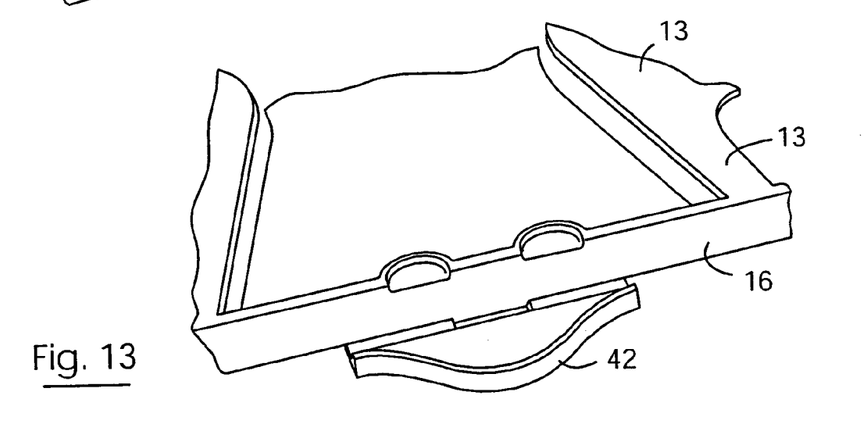
FIG. 13 is a perspective view from a different direction of the detail of FIG. 12.
Figure 14:
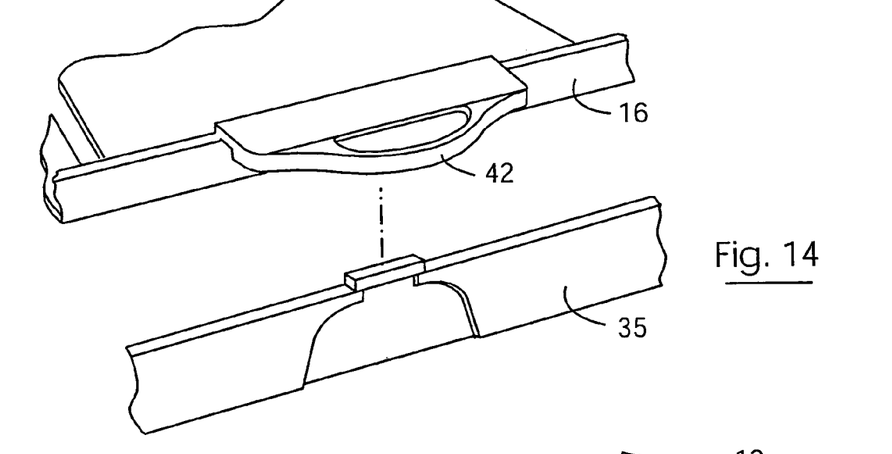
FIG. 14 is an exploded perspective view of another detail of the storage case of FIG. 1 which is illustrated in FIG. 7.
Figure 15:
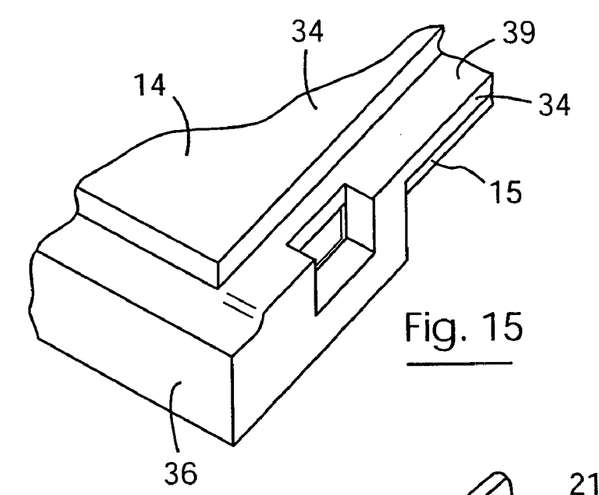
FIG. 15 is a perspective view of a further detail of the portion of the storage case of FIG. 1 which is illustrated in FIG. 7.
Figure 19:
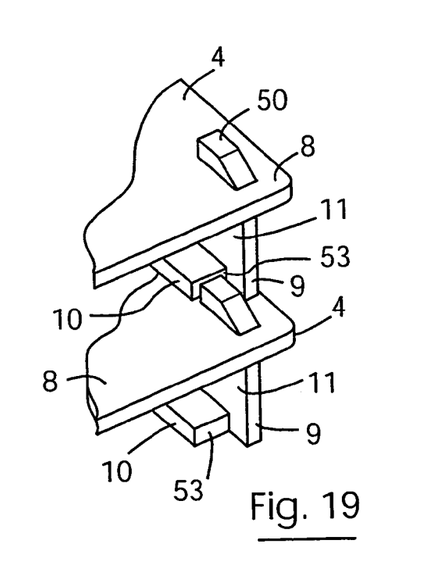
FIG. 19 is a perspective view of another detail of portions of two of the storage cases of FIG. 1 illustrated in a stacked position.
Figure 20:
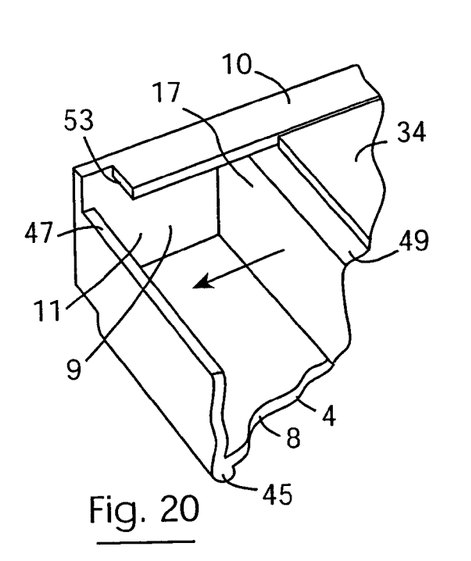
FIG. 20 is a perspective view of another detail of the storage case of FIG. 1.
Figure 21:
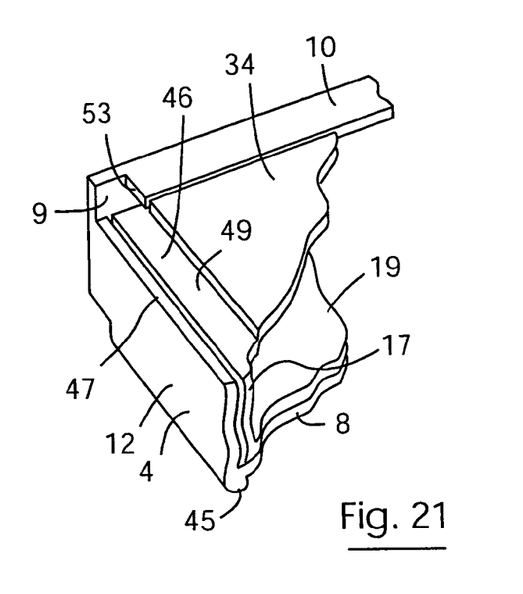
FIG. 21 is a perspective view of the detail of FIG. 20 in a different position, and FIG. 22 Is a perspective view of a detail of the portion of the storage case of FIG. 1 which is illustrated in FIG. 8.
Figure 22:
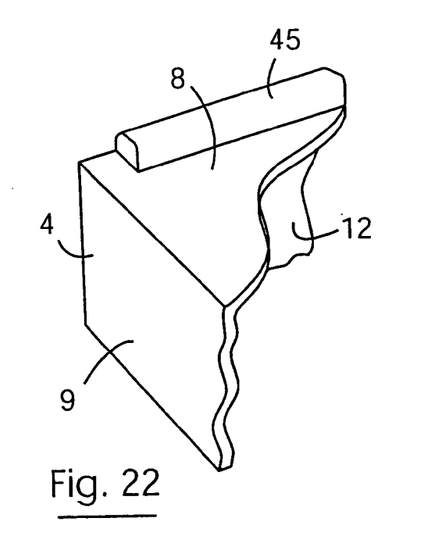

Turning now to the stacking aspect of the storage case 1, and referring in particular to FIGS. 3 to 5, each storage case 1 comprises a locating means which is co-operable with a corresponding complimentary inter-engageable locating means provided on the adjacent storage case 1 for locating the storage cases 1 stacked one above the other. However, each storage case 1 also comprises the complimentary inter-engageable locating means. In this embodiment of the invention one of the locating means comprises a first male locating means, namely, a first male locating member 45 which is formed by an upward extension of the end stop wall 12 of the outer shell 4, see also FIG. 2. The first male locating member 45 engages a corresponding first female locating means, namely, a first locating recess 46 on the underside of the end stop wall 12. The recess 46 is formed by relieving the lower end 47 of the end stop wall 12 along its length, and corresponding end portions 48 of the respective lips 10 of the side walls 9, as well as providing a groove 49 in the base 34 of the outer tray 14 of the inner carrier 5, see FIGS. 8, 20 and 21. The locating means also comprises a second male locating means, namely, a pair of second male locating lugs 50, see FIGS. 2 and 18, which extend upwardly from the top plate 8 of the outer shell 4 towards the front thereof for engaging corresponding second female locating means, namely, a pair of corresponding second locating recesses 51. The second locating recesses 51 are formed by relieving ends 53 of the lips 10 and by forming co-operating recesses 54 in the base 34 of the outer tray 14, see FIGS. 16 and 17. Accordingly, when the inner carrier 5 is in the closed position the second locating recesses 51 are formed. For stacking the storage cases 1 one above the other, the first male locating member 45 of each storage case 1 co-operates with the corresponding female recess 46 in the storage case 1 immediately above, and the locating lugs 50 engage the corresponding recesses 51 in the underside of the storage case 1 above.

In use, when it is desired to stack the storage cases 1 one above the other as illustrated in FIGS. 3 to 5 the storage cases 1 are placed one above the other with the locating recess 46 and the locating recesses 51 of each storage case 1 engaging the corresponding male locating member 45 and locating lugs 50 of the immediately beneath storage case 1. When it is desired to withdraw a compact disc 2 from one of the storage cases 1 the inner carrier 5 is slid from the closed into the open position, and the compact disc 2 is slid sidewardly to one or other side 23 or 24 against the resilient action of the corresponding disc engaging clip 30 outwardly from the disc storing area 20. The compact disc 2 is slid from the disc storing area 20 between the guide plates 25 and 26 and the support benching 21 in the storing plane 18. To insert a compact disc 2 in the disc storing area 20 the compact disc 2 is slid in the storing plane 18 between the guide plates 25 and 26 and the support benching 21 from one side 23 or 24 into the disc storing area 20 against one of the disc engaging clips 30 until the diameter 32 of the compact disc 2 coincides with the centre line 31 of the inner carrier 5. With the compact disc 2 secured in the compact disc storing area 20 by the resilient dips 30 the inner carrier 5 is then slid into the closed position so that in the closed position the outer shell 4 co-operates with the inner carrier 5 for completely enclosing the compact disc storing area 20.

While the storage case has been described as being of plastics material, the storage case may be of any suitable material, and when provided in plastics material it is envisaged that in general, it will be injection moulded, although, needless to say this is not necessary. In general, it is desirable that the material of the storage case should be transparent While the storage case has been described for storing a compact disc, it will be readily apparent to those skilled in the art that it may be used for storing any other disc, a CD ROM disc, a DVD disc, or indeed, any other disc.

What is claimed is:

1. A storage case for a data or music disc, the storage case comprising:
   an outer shell,
   an inner carrier defining a front end and a rear end, and defining a disc accommodating means between the front end and the rear end for receiving and storing a disc therein with the disc defining a storing plane, the inner carrier being slideable in the outer shell in front end/rear end directions between a closed position within the outer shell and an open position extending outwardly of the outer shell for providing access to the disc accommodating means,
   a guide means in the inner carrier for slideably guiding the disc in a sideward direction in the storing plane between the front and rear ends into and out of the disc accommodating means when the inner carrier is in the open position, and
   a securing means in the inner carrier for securing the disc in the disc accommodating means against sliding movement in the storing plane through the guide means.

2. A storage case as claimed in claim 1 in which the securing means is located adjacent the disc accommodating means and extends inwardly thereto for releaseably securing the disc in the disc accommodating means against sliding movement through the guide means.

3. A storage case as claimed in claim 1 in which the outer shell co-operates with the inner carrier for enclosing the disc accommodating means when the inner carrier is in the closed position.

4. A storage case as claimed in claim 1 in which the inner carrier comprises a lower support means for supporting the disc thereon, and an upper retaining means spaced apart from the lower support means and co-operating with the lower support means for defining the disc accommodating means and for retaining the disc in the disc accommodating means against movement of the disc perpendicularly to the storing plane.

5. A storage case as claimed in claim 4 in which the lower support means comprises a support plate for co-operating with the outer shell when the inner carrier is in the closed position for enclosing the disc accommodating means.

6. A storage case as claimed in claim 5 in which the outer shell comprises a top plate and a pair of spaced apart elongated side walls extending downwardly from the top plate for co-operating with the inner carrier for enclosing the disc accommodating means, the top plate of the outer shell and the support plate of the inner carrier extending parallel to each other and being spaced apart from each other when the inner carrier is in the closed position.

7. A storage case as claimed in claim 6 in which a pair of spaced apart front and rear end walls extend upwardly from the lower support means of the inner carrier and define with the lower support means and the upper retaining means the disc accommodating means, the front and rear spaced apart end walls extending between the side walls of the outer shell when the inner carrier is in the closed position.

8. A storage case as claimed in claim 4 in which the securing means is located between the lower support means and the upper retaining means of the inner carrier.

9. A storage case as claimed in claim 4 in which the securing means comprises a pair of spaced apart disc engaging clips for engaging the disc on respective opposite sides of a diameter of the disc, and for urging the disc diametrically along the said diameter into engagement with a diametrically opposed disc abutment means for securing the disc in the disc accommodating means, at least one of the disc engaging clips being resiliently mounted for resiliently engaging the disc as the disc is slid from one side into and out of the disc accommodating means.

10. A storage case as claimed in claim 4 in which the guide means is provided to one side of the upper retaining means for slideably guiding the disc into and out of the disc accommodating means.

11. A storage case as claimed in claim 10 in which a pair of guide means are provided on respective opposite sides of the upper retaining means.

12. A storage case as claimed in claim 4 in which each guide means comprises a pair of spaced apart guide plates located above and spaced apart from the lower support means at respective opposite ends thereof for slideably guiding the disc into and out of the disc accommodating means.

13. A storage case as claimed in claim 1 in which a locating means is provided on the outer shell for co-operating with an outer shell of an adjacent storing case for accommodating stacking of the storage case with the other storage case, one above the other.

14. A storage case as claimed in claim 13 in which the locating means comprises one of a first male and female locating means mounted on one of a side or end of the outer shell for co-operating with a corresponding other of a first male or female locating means on the outer shell of the other storage case, and one of a second male and female locating means on the other of the side or end of the outer shell for co-operating with a corresponding other of a second male and female locating means on the outer shell of the other storage case, the other of the first male and female locating means and the other of the second male and female locating means being provided on the outer shell for co-operating with corresponding others of first and second male and female locating means on an outer shell of another storage case.

15. A storage case as claimed in claim 14 in which the first male locating means extends upwardly from the top plate of the outer shell, and the second male locating means extends upwardly from the top plate of the outer shell.

16. A storage case as claimed in claim 4 in which one of the inner carrier and the outer shell defines a label accommodating means.

17. A storage case as claimed in claim 16 in which the lower support means of the inner carrier is of double skinned construction for defining the label accommodating means therebetween.

18. A storage case as claimed in claim 1 in which the disc accommodating means is a disc storing area, and defines a compact disc, which may be one of a CD ROM compact disc, a music compact disc, and a DVD disc.

19. A storage case as claimed in claim 1 in which a first grip means is provided for releasably engaging and retaining the inner carrier in the closed position in the outer shell.

20. A storage case as claimed in claim 1 in which a second grip means is provided for retaining the inner carrier connected to the outer shell when the inner carrier is in the open position.

21. A storage case as claimed in claim 6 in which each side wall of the outer shell defines an elongated track for slideably engaging and accommodating the inner carrier between the open and closed positions.

22. A storage case as claimed in claim 7 in which the upper retaining means of the inner carrier comprises an upper retaining member extending between the respective front and rear end walls.

* * * * *